Aug. 6, 1935.   C. HOPLEY   2,010,303

GARDEN HOE

Filed March 4, 1935

INVENTOR.
by Charles Hopley
J. Ouden O'Brien
atty.

Patented Aug. 6, 1935

2,010,303

UNITED STATES PATENT OFFICE 2,010,303

GARDEN HOE

Charles Hopley, Worsley, England

Application March 4, 1935, Serial No. 9,210
In Great Britain March 21, 1934

1 Claim. (Cl. 97—68)

The invention relates to an improved tiller hoe for garden and horticultural use.

According to the invention the tool is constructed with two or more triangular prongs projecting from a flat plate or base each prong being twisted about its longitudinal axis to incline it to the base and provided with a socket integral therewith to receive a stale or shaft by which to handle the hoe.

The invention will be fully described with reference to the accompanying drawing:—

Figure 1:
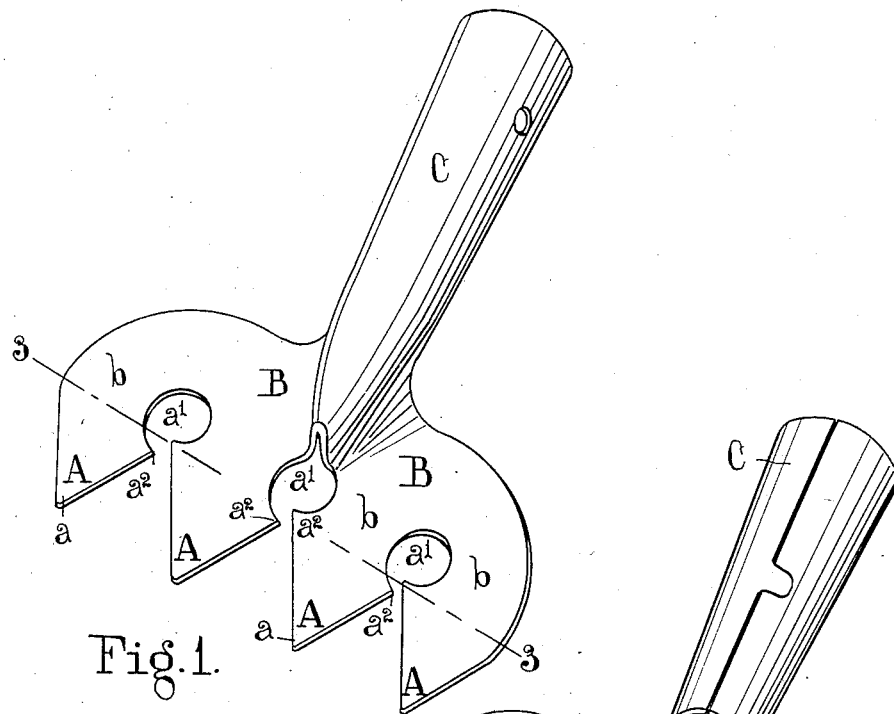
Figure 2:
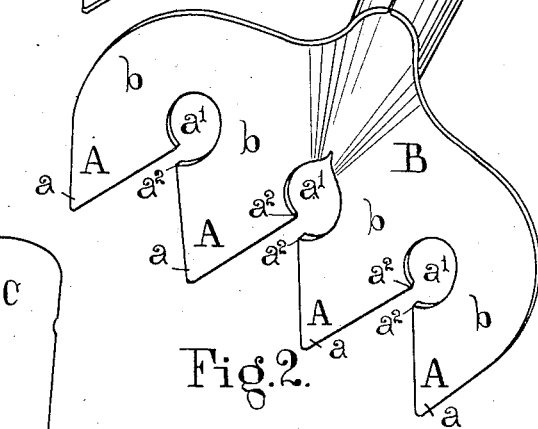
Figure 3:
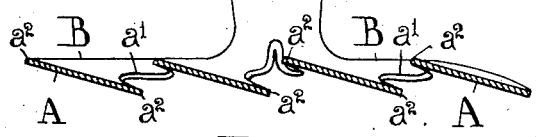

Fig. 1 is a perspective view from the front,
Fig. 2 is a perspective view from the back,
Fig. 3 is a transverse section on line 3—3 Fig. 1.

The tool or tiller hoe comprises a plurality of prongs or teeth A each of triangular shape with a forward penetrating point at $a$ which will readily penetrate beneath the surface of the soil. A space or aperture $a^1$ preferably circular is stamped or pressed out between the roots of each pair of prongs forming a narrow neck $b$ to each prong between it and a base B from which the several teeth project forward. Each prong A is twisted at its neck $b$ about its longitudinal axis to set the prong at an inclination to the base B as shown in section in Fig. 3. The base B is shaped into a ferrule C to receive a stale or shaft by which to handle the tool. It is designed to create a fine tilth of the soil and withdraw the weeds at the same time.

In operation the points $a$ of the prongs or teeth A readily enter the soil and the inclination of prongs to the horizontal cause the soil or earth to be turned over while the projecting points at $a^2$ catch upon and uproot weeds as the tool or implement is drawn backward.

What I claim as my invention and desire to protect by Letters Patent is:—

A tiller hoe for garden and horticultural use constructed with a plurality of triangular prongs projecting from a flat base with a forwardly penetrating point and provided with a space or aperture between the roots of each pair of prongs forming a narrow neck to each prong the said narrow neck of each prong being twisted about its longitudinal axis to set the prong at an inclination to the base.

CHARLES HOPLEY.